May 28, 1963 V. MORRILL, JR 3,091,104
METHOD FOR SHAPING A GLASS TUBE PREFORM
Filed May 5, 1958 2 Sheets-Sheet 1
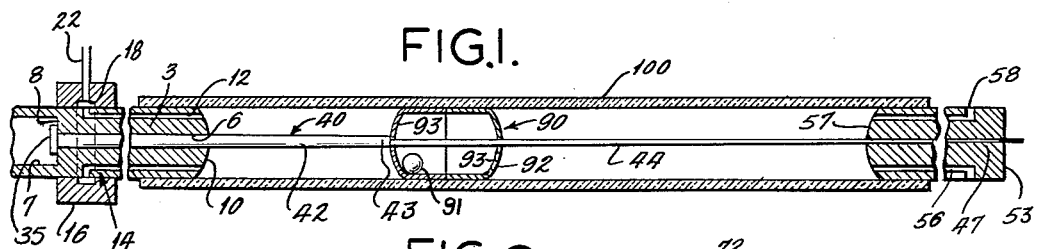
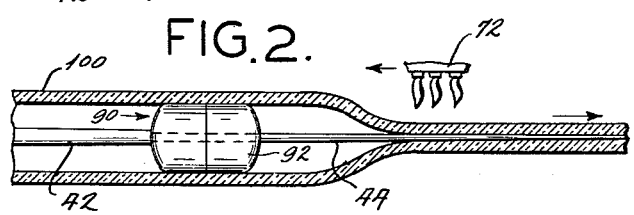
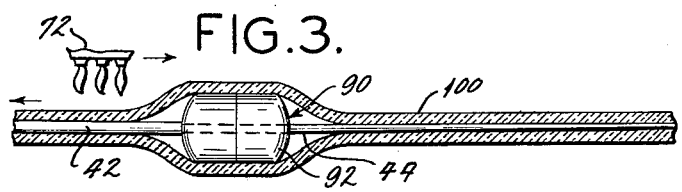
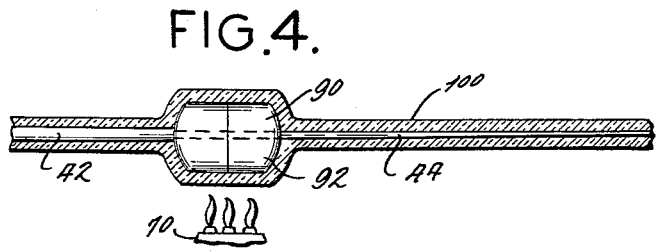
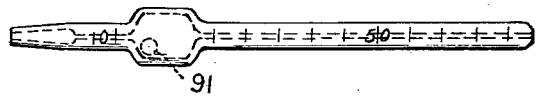
INVENTOR
VAUGHAN MORRILL Jr.
By *Philip B. Polster*
ATTORNEY – # United States Patent Office 3,091,104
Patented May 28, 1963

3,091,104
METHOD FOR SHAPING A GLASS TUBE
PREFORM
Vaughan Morrill, Jr., 9747 Litzinger Road,
Brentwood, Mo.
Filed May 5, 1958, Ser. No. 733,794
8 Claims. (Cl. 65—23)

This invention relates to hollow glass articles and methods and apparatus for their manufacture. It is described as applied to the manufacture of blood dilution pipettes, but it has broad application to the manufacture of other articles such, for example, as hypodermic syringes, volumetric burettes, taper tube flow meter tubes and the like. This application is a continuation in part of my applications, Serial No. 470,875, filed November 24, 1954 and Serial No. 481,807, filed January 14, 1955, now abandoned.

In the manufacture of such precision bore glass articles as blood dilution pipettes, volumetric burettes, hypodermic syringes and taper tube flow meters, it has heretofore been found necessary to form each piece slowly, with extreme care. This has made them expensive, and frequently not uniformly accurate.

For example, taper tube flow meters have been made on machines, where they are formed on a solid, tapered, generally stainless steel mandrel. A piece of glass tubing closely approximating the size of the mandrel is placed on the mandrel, and the mandrel and the tubing are rotated simultaneously while the tubing is slowly and carefully heated locally to a softness at which it can just be brought down onto the mandrel by a high vacuum which has been applied from the unheated end of the blank, toward which the heating flame moves. The heating has to be carefully controlled so that softened glass is not sucked back under the unheated part of the tube toward the vacuum source, and so that the glass does not wet the mandrel. This is particularly difficult because the mandrel is heated to substantially the same temperature as the softened glass. In fact, the mandrels are frequently preheated. The high heating of the mandrel not only has been considered inevitable, because of the slowness of the heating of the glass and the fact that the mandrel is uncooled, but essential, because the greatest possible difference in the contraction of the glass and mandrel has been required, to permit the mandrel's being pulled. Also, it has been the practice to use "Pyrex" glass for this purpose because it has been necessary to obtain the greatest possible difference in the coefficients of expansion of the glass and the mandrel.

As has been stated, the heat is applied locally so that there is produced in effect a hump along the mandrel onto which the glass is sucked down. As the point of heating is advanced toward the source of vacuum, the hump recedes from the inside surface of the glass leaving the walls of the bore of the hardening glass unsupported by the mandrel, so that at the end of the travel of the heating means, the mandrel can be pulled.

Because it has been necessary to rely upon the difference in expansion of the glass and metal mandrel, and because the mandrel, being uncooled, is sensitive to local heating, it can be seen that the size of the bore formed on such a mandrel has been determined by the amount of local heating of the mandrel at each point, and consequently to obtain even approximate uniformity of the bore, the process has had to be extremely slow and costly.

Blood dilution pipettes used for determining blood counts have heretofore been made by hand, the central bulb being hand blown, and each bulb and capillary tube individually hand calibrated. As presently accomplished, the manufacture of such pipettes has required some nineteen steps including the grading of capillary bore tubing, cutting the tubing to length, blowing the bulb, cutting the bulb open. Thereupon, a mixing bead has been inserted and the bulb reclosed. Further steps include annealing, measuring the volume of bulb and capillary and marking the pipette, coating the pipette with wax, graduating the pipette with a stylus, etching, washing, dewaxing, rewashing, drying, pulling the tube end, cutting and fire-polishing the tube end, cutting the tip end and pointing it, painting the pipette, baking the paint, and packing. It can be appreciated that this is a laborious and expensive method since all the steps must be performed by hand and many of them require a high degree of skill and manual dexterity.

So far as I have been able to determine, no machine has been known heretofore which is capable of producing a glass pipette or similarly configured glass article to precise dimensions in one operation.

One of the objects of this invention is to provide an improved method of forming glass articles with an accurate bore, which method is simple, cheap, fast and efficient as compared with processes known heretofore, and which produces articles of great uniformity.

Another of the objects of this invention is to provide a process and apparatus capable of producing blood dilution pipettes and similar devices from common lead, soda-lime or borosilicate glass tubing with great uniformity.

An additional object is to provide such a process and apparatus in which the number of steps required is greatly reduced as compared with the number now required, and which is capable of producing articles such as syringes, volumetric pipettes and burettes and the like rapidly and cheaply with little or no hand skill.

Still another object is to provide a blood dilution pipette having novel characteristics.

Other objects will become apparent to those skilled in the art in the light of the following description and accompanying drawings, in which there is exemplified one procedure primarily directed to the production of a pipette. While this reveals a preferred example of the invention, it is to be understood that the disclosure is to be taken in an illustrative rather than a limiting sense. Thus, in the drawings:

FIGURE 1 is a somewhat diagrammatic sectional view of a glass blank mounted on a spindle and containing a tapered mandrel and shell of this invention, to produce a blood dilution pipette;

FIGURE 2 is a fragmentary sectional view of the blank shown in FIGURE 1 as the capillary bore is being formed;

FIGURE 3 is a fragmentary sectional view of the blank shown in FIGURE 1 as the upper restricted portion is being formed;

FIGURE 4 is a fragmentary sectional view of the blank shown in FIGURE 1 as the bulb section is being formed;

FIGURE 5 is a view of the finished pipette;

FIGURE 6 is a diagrammatic view of the apparatus upon which the process is carried out;

Figure 7:
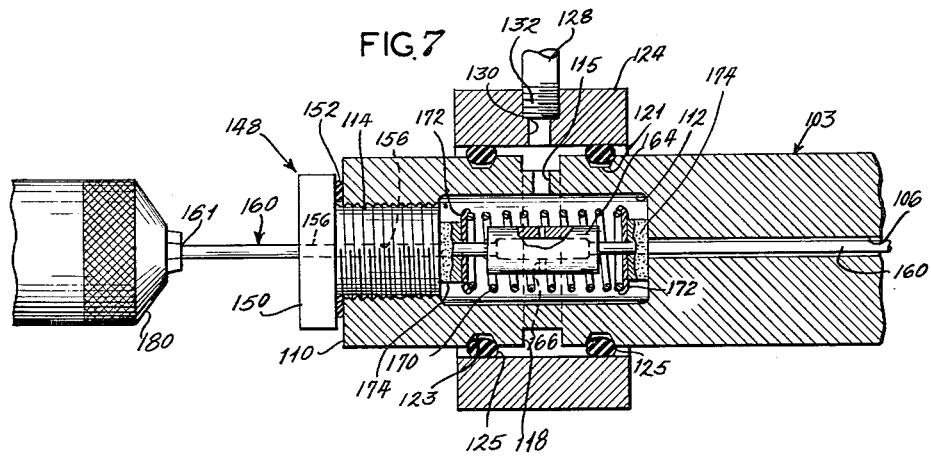
FIGURE 7 is a fragmentary detail view, partly in section and partly broken away, showing a gland arrangement of one form of apparatus by which the method of this invention may be carried out.
Figure 8:
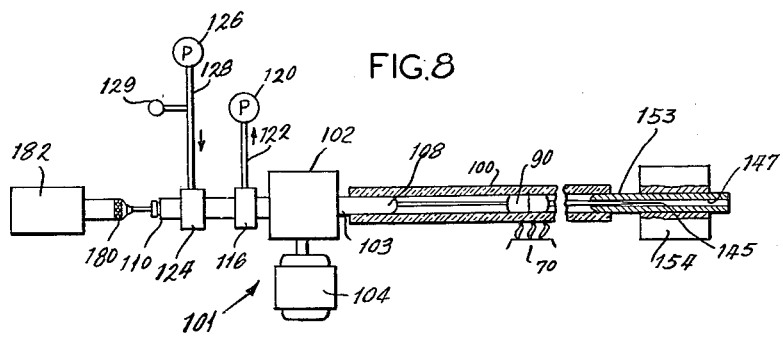
Figure 9:
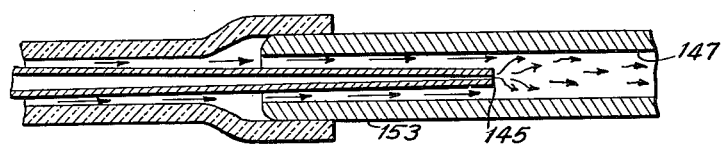

FIGURE 8 is a fragmentary somewhat diagrammatic view of a form of apparatus upon which the method of this invention can be carried out, having a vibrator for the mandrel; and FIGURE 9 is a fragmentary enlarged sectional view of the tailstock end of the apparatus shown in FIGURES 7 and 8, showing the glass blank in collapsed condition, and indicating, by arrows, the aspirating effect of high pressure air issuing from the mandrel.

In accordance with this invention, generally stated, a method of producing hollow articles on a form, such as a thin mandrel, is provided, which includes the steps of ensleeving a glass preform about a form or mandrel, heating the blank to its softening temperature progressively from one end toward the other end thereof, and thereupon progressively collapsing the glass on the form. This is accomplished by applying a vacuum to the interior of the blank at the softened end thereof and from which the heating is progressing, so that after the initial collapse of the softened blank the vacuum is applied along the interior of the already collapsed blank. While the vacuum is preferably maintained, the glass is cooled below its softening temperature and is thereupon removed from the mandrel.

In producing an article of the character of a blood dilution pipette, in which two cylindrical bore sections of relatively small inside diameter are separated by a medial enlarged cavity section, the form is a mandrel, upon which a shell of known outside dimensions is removably mounted. The shell is made of a material which can be dissolved or slurried in a medium by which the glass is substantially unaffected.

While one of the advantages of the process and apparatus of this invention is that they may be used to produce pipettes and the like from soft glass, they also make it practical to produce such articles from borosilicate type glasses and thereby to utilize the superior thermal and mechanical shock characteristics of these glasses. The white-back capillary tubing used in the time-honored hand method of making pipettes is manufactured commercially only in soft glass compositions, whereas standard glass tubing suitable for use in this process is commercially manufactured in a wide variety of compositions, including both soft glasses and borosilicate type glasses, of which "Pyrex" is typical.

Referring now to FIGURES 1 and 6 of the drawing reference numeral 1 indicates a complete machine. The machine includes a headstock 2 in which a spindle 3 is mounted for rotation of a motor 4. The spindle 3 is provided with a central bore 6 and a counterbore 7 forming a shoulder 8. Passages 12 extend through the inner end 10 of the spindle and terminate at their other ends in radial passages 14. The passages 14 extend through the perimeter of the spindle 3 between the shoulder 8 and the headstock 2. A vacuum gland 16, having an annular channel 18 in its inside face, is mounted on the spindle over the passages 14. The channel 18 thus communicates with the passages 14, and is connected with a vacuum pump 20 by means of a conduit 22. The counterbore 7 is also provided with corresponding radial passages though the wall of the spindle near its outer end 30. A pressure gland 24, similar in construction to the vacuum gland 16, surrounds the passages leading to the counterbore 7 and communicates with a compressor 26 by means of a conduit 28. The conduit 28 is provided with a pressure gauge 29. The outer end 30 of the spindle 3 is conveniently closed by means of a removable cap 31.

Mounted within the bore 6 of the spindle 3 is a mandrel generally indicated at 40. At one end of a heavy section 42, the mandrel 40 is provided with an annular flange or head 35 which seats against the shoulder 8 and forms a substantially airtight seal therewith. The mandrel 40 is hollow throughout its length, and open-ended. It has the relatively heavy section 42 and a thin section 44. The sections 42 and 44 are concentric and the difference in their respective diameters produces, at their meeting place, a radial shoulder 43. In the embodiment shown, both the heavy section 42 and the thin section 44 are tapered.

As an illustrative example of dimensions of the mandrel which are suitable, the part of the thin section 44 upon which the capillary bore is formed may be approximately two and one-half inches long, with a uniform inside diameter of .01 inch and an outside diameter at its thick end, where it meets the heavy section 42, of .02 inch. The over-all length of the thin section 44 is abount four inches to permit relative movement of a tailstock as is hereafter described. The outside diameter of the thin section 44 tapers uniformly in a direction away from the spindle 3 at the rate of .001 inch per inch of length. The outside diameter of the heavy section 42 at the point at which the thin and heavy sections join is approximately .032 inch and also tapers in the same direction as the thin section. The mandrel may conveniently be made of two pieces of tapered cannula or hypodermic needle tubing soldered or welded together.

The free end of the section 44 is seated in a bore 47 in a spindle 53 carried by a tailstock 54. Although the driving connection is not shown, the spindle 53 is preferably driven by the motor 4 and, in any event, rotates synchronously with the spindle 3. The spindle 53 extends through the tailstock 54. It is provided with axially extending passages 56 open at the inner end 57 of the spindle 53 and connected with radial passages 58 through the perimeter of the spindle. The radial passages 58 communicate with a channel in a vacuum gland 60 which in turn is connected to a vacuum pump 62 by means of a flexible conduit 63. A gland 64 connects the open end of the thin section 44 of the mandrel with a manometer or flowmeter 65 by means of a flexible conduit 66, thence with the atmosphere. The tailstock 54 is arranged to be moved either toward or away from the headstock 2 by a lead screw 68 driven by a reversing motor 69.

Beneath the thin section 44 of the mandrel 40 near its juncture with the heavy section 42 is a group of burners 70.

Mounted to travel along and parallel with the axis of the mandrel 40, but spaced a substantial distance therefrom, is a traveling burner 72. In actual practice, a pair of such burners, oppositely disposed, has been found desirable. The traveling burner 72 is moved in either direction by burner lead screw 74 driven by a reversing motor 75. The burner 72 is supplied with gas through a flexible connection, no here shown. The burner 70 is also supplied with gas. Solenoid-actuated valves are interposed in the gas supply lines.

A magnet 80 is positioned beneath the heavy section 42 of the mandrel 40.

The elements described, along with controls by which the machine is operated automatically, constitute the permanent elements of the machine 1.

In the manufacture of each pipette, a mixing bead 91 (FIG. 5) is placed within a shell 90, and the shell is mounted on the thin section 44 of the mandrel 40, abutting the shoulder 43. In the embodiment shown, the shell 90 consists of a pair of similar steel cups 92, each provided with a central hole 93 in its bottom. The open edges of the cups 92 abut so as to form a hollow thin-walled enclosure having the external configuration of the desired inner shape of the bulb of the pipette to be formed. The steel cups 92 are slipped over the thin end of the mandrel, engaged to form the enclosure or shell and are held in place against one another and against the shoulder 42 by the attraction of the magnet 80.

It has been found that if the shell 90 is sand blasted instead of being made entirely smooth on its exterior surface, two desirable results are obtained. First—and of great importance—the glass does not have as great a tendency to stick to the surface of the sandblasted shell as it does to a polished shell. This is because in the present process there is involved the heating of the glass to a high temperature. Second, the sand blasted shell produces a frosted surface on the inside of the bulb of the blood dilution pipette. Such a surface gives a positive indication of the dryness of the inside of the bulb. When the inside surface of the bulb is damp, the frosted appearance tends to disappear. In this way, when the pipettes are reused, the technician can immediately ascertain whether the inside of the pipette has been thoroughly dried. Also, the slightly roughened surface caused the mixing bead to more readily tumble and thus facilitates mixing.

A glass blank 100 is mounted around and to extend beyond both ends of the shell 90 and on the spindles 3 and 53. The blank 100 is held in place by simple chucks, not here shown, and has its ends ensleeved around the spindles 3 and 53.

While the cups 92 may be made of different materials, and the shell 90 may be made in one piece and may even be solid except for a bore to permit it to be mounted on the mandrell, the use of steel cups has been found eminently satisfactory for several reasons. The steel cups may conveniently be held in place by a magnet. They are cheap and may be drawn with a uniform outside accuracy of plus or minus .001 inch in the over-all dimensions, using common manufacturing techniques. In addition, the thinness of the walls, and the large area of the inside surface of the cups facilitates their destruction at a subsequent stage of manufacture.

When the cups are formed of nonmagnetic material, they may be maintained in position gravitationally. This is accomplished by tilting the axis of the mandrel, as by raising the tailstock end of the machine, or frictionally, by making the cups fit snugly on the mandrel.

The process of this invention as applied to blood dilution pipettes consists preferably of forming a capillary section on a mandrel in such a way that the mandrel can be pulled. Thereupon, there is formed another small bore section on a mandrel on the side opposite the bulb from the capillary. Then there is produced a bulb section on a shell of material which can later be destroyed. The mandrel is finally withdrawn and the shell inside the formed article is destroyed. It can be seen that the principle of the process has wide application to articles having one or more restricted hollow sections with an enlarged section communicating therewith.

The process as carried out on the apparatus described and with primary reference to FIGS. 1 and 6, is as follows:

Assume that the mandrel is not yet inserted and the cap 31 of the spindle 3 is removed. The tailstock 54 is moved away from the headstock 2 a distance greater than the length of a blank 100. The mandrel is inserted into the bore 6, but before the free end of the thin section 44 reaches the spindle 53, accurately dimensioned cups 92, in which the mixing bead 91 is placed, are slid onto the mandrel, in proper sequence, over its free end until the foremost cup meets the shoulder 43. If the magnet 80 is employed, it will then hold the cups in place and in properly assembled condition, with the mixing bead inside the hollow section.

A section of soft glass tubing 100 is slipped over the mandrel, the cups, and the spindle 3. With a mandrel of the dimensions indicated, and steel cups with an outside diameter of .375 inch, tubing with an internal diameter of about .4 inch is suitable. The thin end of the mandrel is inserted within the bore 47 of the spindle 53. The tailstock 54 is moved up toward the headstock 2 while the glass blank 100 is slipped over the spindle 53. The mandrel is positioned so that the flange or head 35 seats against the shoulder 8. The cap 31 is then replaced. The chucks on the spindles 3 and 53 are tightened to hold the glass blank 100 in position.

The compressor 26 is started, and a stream of air, preferably at about 500 pounds pressure per square inch (for the dimensions of the mandrel indicated and lead glass tubing), is blown through the mandrel. Other fluids may be used, but compressed air is cheap and satisfactory. It can be seen that since the open thin end of the mandrel is connected with the atmosphere, the pressure in the counterbore 7 tends to seat the flange 35 against the shoulder 8. The unlighted burner 72 is positioned just inward of the end of the spindle 53. The burners 70 are also unlighted. Igniting of the burners at proper moments may be effected by suitably controlled sparking devices. The vacuum pumps 20 and 62 are idle. The flow of fluid through the mandrel is registered by the manometer or flowmeter 65.

The motor 4 is then started, to rotate the blank 100. The gas supply to the burner 72 is turned on and the burner ignited. The pump 62 is started, to produce a vacuum within the tailstock end of the glass blank. As the blank softens under the heat of the burner 72, the tailstock 54 is moved momentarily toward the headstock 2 by the operation of the motor 69, which is controlled by a timer set in operation when the burner 72 is ignited. This has been found to be desirable for the reason that if the tailstock is moved away from the headstock immediately, the wall of the blank is likely to be attenuated. By initially shortening the tube, the wall thickness is momentarily increased, and when the tailstock is subsequently moved away from the headstock, the wall thickness is made uniform. The movement of the tailstock away from the headstock has two effects: First, it tends to pull the glass inwardly against the mandrel and second, it controls the wall thickness and therefore the outside diameter of the capillary section. As an aid in producing a uniform outside diameter of the capillary section, a set of rollers may be provided, following a short distance behind the burner and bearing on the outside surface of the soft blank.

When the flame from the burner 72 has reached a position slightly beyond that shown in FIG. 2 and immediately adjacent the shell 90, the flame of the burner is extinguished by a suitable control valve, but the burner continues to travel toward the headstock. The movement of the tailstock is stopped. As the burner 72 reaches a position immediately beyond the headstock side of the shell 90, the burner is re-ignited and the blank is collapsed on the heavy section 42 of the mandrel as shown in FIGURE 3. As the burner 72 approaches the end 10 of the spindle 3, the flame is once more extinguished. Burner 70 is then ignited. Preferably the burner 70 provides more heat to the tailstock side of the shell 90 then to the headstock side, since the headstock side has more recently been heated by the burner 72. After this bulb section has been heated, burner 72 is extinguished and vacuum pump 20 turned on to withdraw air from spaces between the mandrel assembly and the blank. Accordingly, atmospheric pressure assists in the collapsing of the blank 100 around the shell 90 and to some extent around the heavy section 42, as shown in FIG. 4. It has been found that by following the steps outlined, the inside surface of the blank around the shell 90 can be made to conform identically to the contour of the shell, to produce a bulb of exactly known internal dimensions. The formation of the bulb requires only a short time, since the glass has been preheated by the burner 72. Within the short interval required for the formation of the bulb, the steel cups 92 are capable of conducting away enough heat to prevent their being fused to the glass, without any other provisions for their cooling. Furthermore, before the vacuum is applied a small space is left between the blank and the cups when the blank is softened. The flame is removed before the vacuum is applied to suck the glass down on the shell and mandrel, so that the glass is actually in the process of cooling when it is brought down against the shell and mandrel.

The blank need be allowed to cool only until the glass is self-supporting. The motor 4 is then stopped. The blank-holding chucks are loosed, the tailstock is moved back sufficiently far to permit the blank to be removed from the spindles 3 and 53, and the blank is withdrawn from the small end of the mandrel. The cups 92 remain within the formed blank.

The usual elongated bubble at the suction end of pipette may be blown in any convenient way. A mechanical method is described in my United States Patent No.

2,735,230 entitled, "Process of Fabricating Glass Articles," and dated February 21, 1956, and such an arrangement may be incorporated in the present apparatus.

The pipettes may be trimmed and annealed in the usual manner, with the steel cups in place.

Acid, preferably fifty-fifty nitric acid, is now circulated through the pipettes, which, in a very short time, dissolves the steel cups. The pipette is then rinsed to remove the residual acid and salts. The rapid dissolution of the steel cups is made possible by the fact that the acid has access, through holes 93, to the inside surface of the cups, which have a large area.

When a glass or similar mixing bead 91 has been initially inserted within the hollow cups it remains in the bulb after the cups have been dissolved.

The pipettes may then be calibrated simply by applying a standard decalcomania. Theoretically, the calibrations along the capillary tube should take into account the taper, however, of the bore. The taper is so small that as a practical matter it may not be necessary to vary the spacing of the calibration. At the same time, since the taper is uniform, it is a simple matter to work out the exact calibration.

The application of the decal can, of course be accomplished at any step after the pipette is formed.

The forcing of cooling fluid through the mandrel while the tube is being shrunk down thereon is important. The optimum volume of fluid, gas or liquid to be used will depend upon a number of factors including the length of the pipette, its inside diameter and the kind of glass of which it is made. In the illustrative example described, the dimensions of the mandrel permit a flow of air, at an initial pressure of 500 pounds, of approximately 6 liters per minute, measured at atmospheric pressure. It is believed that while the lead glass in the illustrative embodiment described attains a working heat of about 1400° to 1700° F., the temperature of the mandrel remains in the neighborhood of 800° F. If the mandrel is maintained too cool, the glass will not pull down upon it satisfactorily. If the mandrel is allowed to become too hot, it is wet by the glass and cannot be pulled. Therefore, as compared with processes known heretofore, the present process admits of very wide latitude in the range of operative temperatures.

The cups are not air cooled and reach a considerably higher temperature than the mandrel. However, as has been pointed out, the glass around the cups need be reduced only slightly, the operation can be accomplished quickly, and the glass is actually cooling when it is sucked down on the cups. The weight of metal in the cups appears to be sufficient to maintain the temperature of the cups below the wetting temperature of the glass.

The use of the tapered fluid-cooled mandrel of this invention makes it possible to produce a precision bore capillary tube at an extremely rapid rate as compared with methods and apparatus known heretofore. The capilary-forming operation can be performed on an untapered fluid-cooled mandrel with the apparatus of FIGURES 1-6 by closely controlling the heating temperature and the rate of flow of cooling fluid. Accordingly, this causes the glass defining the bore to harden before it can reach the surface of the mandrel. The clearance between glass and mandrel may be a few ten thousandths of an inch or less. As long as the glass does not actually contact the surface of the mandrel the mandrel can be pulled. However, even as compared with this method, with this embodiment of apparatus the use of a tapered mandrel permits relatively great latitude in heating temperatures and fluid flow rates.

Referring now to FIGURES 7-9 of the drawing for another illustrative embodiment of apparatus by which the method of this invention may be carried out, reference numeral 101 indicates a machine which may be substantially the same as that in FIGS. 1 and 6. However, this machine permits the mandrel to be given relative movement with respect to an article being formed on it. Also, it embraces a modified vacuum system. The machine (as in FIG. 8) includes a headstock 102, in which a spindle 103 is mounted for rotation by a motor 104, and a tailstock 154.

As in FIG. 7, the spindle 103 is provided with a central bore 106, extending through and between an inner end 108 and an outer end 110 of the spindle 103. Near, but spaced inwardly from, the outer end 110, the bore 106 is enlarged to form a cavity 112. An enlarged internally threaded section 114 of the bore 106 is provided between the outer end 110 and the cavity 112. A passage 115 extends radially through the wall of the spindle 103 from the cavity 112 and communicates with an annular channel 118 in the outer surface of the spindle 103. Annular grooves 121 and 123, trough-shaped in cross section, extend around the spindle 103 on either side of the channel 118. Rubber O rings 125 are seated in the grooves 121 and 123 and bear against the inside surface of a pressure gland ring 124. A passage 130 extends radially through the ring 124 and is internally threaded to receive a threaded end 132 of a pipe 128. The pipe 128 is connected to a source of high pressure fluid such as an air pump 126. A pressure gauge 129 is connected to the pipe 128.

A vacuum pump 120 is connected by a pipe 122 to a vacuum gland 116 around the spindle 103 between the pressure gland 124 and the headstock 102. The gland 116 communicates with the bore 106.

An externally threaded plug 148, having a head 150, is screwed into the internally threaded section 114 of the bore 106. A gasket 152 between the head 150 of the plug and the outer end 110 of the spindle serves to seal the bore 106 from leakage through the threaded section 114. A hole 156 extends centrally through the plug 148.

A hollow mandrel 160, open at its tailstock end, is journaled in the bore 106, and extends beyond both the inner end 108 and the outer end 110 of the spindle 103. Within the cavity 112, the hollow mandrel 160, is, in the embodiment shown, provided with a node 164. The node 164 simply provides a convenient way of introducing high pressure fluid into the interior of the hollow mandrel 160. To this end the node 164 is hollow and is provided with radially extending passages 166 extending completely through the wall of the node. In this embodiment, the mandrel from the inner end 108 of the spindle is soldered or otherwise secured to the node 164 in such a way that the interior of the mandrel communicates with the interior of the node. The end of the mandrel which projects from the outer end 110 of the spindle is also secured in the node 164, but since no fluid is to flow through the mandrel 160 in a direction toward the end 110 of the spindle, the interior of that end of the mandrel need not communicate with the interior of the node. A helical spring 170, bearing against opposed washers 172, biases rubber seals 174 against an end wall of the cavity 112 and the inner end of the plug 148 respectively.

An end 161 of the mandrel 160 is firmly mounted against rotation in a chuck 180 of a vibrator 182. The vibrator 182 may, in the illustrative embodiment shown (in which a blood dilution pipette is being formed), be a simple A.C. vibrator.

The opposite end 145 of the mandrel 160 extends loosely into a bore 147 of a spindle 153 in the tailstock 154. The bore 147, which, as shown in FIGURE 9, is large with respect to the mandrel 160, communicates with the atmosphere. It may be connected to a flowmeter, to allow the rate of flow of the cooling fluid to be measured. The tailstock 154 is constructed to move longitudinally toward and away from the headstock 102. The mandrel is sufficiently long to remain journaled in the bore 147 during the forming process, but is short enough to clear the inner end of the spindle to permit the blank to be put on and the finished article to be removed over the end 145 when the tailstock 154 is moved to its extreme limit of travel away from the headstock.

In assembling the apparatus described, the plug 148 is removed from the threaded section 114 of the bore and the chuck 180 is moved out of the way. The inner of the washers 172 is slipped over the end 145 of the mandrel and positioned adjacent the node 164, followed by a rubber seal 174. The spring 170 is slipped over the end 161 of the mandrel and around the node 164, followed by the outer washer 172 and the outer seal 174. The end 145 of the mandrel is then inserted in the bore 106 from the end 110 of the spindle until the innermost seal 174 bears against the inner end of the cavity 112. The plug 148, with the gasket 152 around it is then slipped over the end 161 of the mandrel and screwed into the threaded section 114. The spring 170 serves to seat the seals 174 so that when high pressure fluid is introduced into the cavity 112, the seals 174 are properly positioned to be held tightly in place by the pressure of the fluid. The end 161 of the mandrel is put into the chuck 180 and clamped tightly therein.

The tailstock 154 has been in its most distant position with respect to the headstock so that the end 145 of the mandrel has not reached the tailstock spindle 153.

The mandrel is preferably wiped with a pad on which is a small amount of colloidal carbon, to ensure that the mandrel is free of dirt and to apply thereto an extremely thin coating of colloidal carbon. A suitable colloidal carbon is sold commercially under the name "Aquadag." A hollow, thin-walled shell 90, preferably made up of a pair of cups, is slipped onto the mandrel over the free end 145, until it engages a shoulder on the mandrel, and a blank of clean, soft glass tubing (corresponding to blank or preform 100) is slipped over the free end 145 of the mandrel and onto end 108 of the spindle 103.

The tailstock 154 is now moved toward the headstock 102 and the end 145 of the mandrel is inserted within the bore 147 of the spindle 153. Continued movement of the tailstock toward the headstock brings the spindle 153 within the end of the blank. Collets on the spindles 103 and 153 serve firmly to grasp the ends of the blank and seal the ends from leakage between the blank and the outer surface of the spindles.

The vibrator 182 may be operated at 7200 cycles per minute on ordinary sixty cycle alternating current. It serves to prevent "freezing" or adhesion between the mandrel and blank as the latter is conformed to the mandrel. Such vibrator action is of especial value, having in mind the small bore diameters involved. The glass may be rotated about the mandrel at around 300 r.p.m. Compressed air at about 500 pounds per square inch in supplied to the mandrel, which, in the illustrative embodiment shown, has an inside diameter of .01 inch. Under these conditions, the soft glass tubing is conveniently heated to 1500–1700° F., to the point at which it is soft enough to sag unless it is rotated.

The heating of the glass tubing is preferably done by means of a flame which travels progressively from the tailstock end toward the headstock end until it reaches the shell 90. As the glass being heated softens, the tailstock is moved away from the headstock to control the outside diameter of the pipette. During this operation, no vacuum is applied from the headstock end of the blank. However, in this embodiment, the high pressure air issuing at high velocity from the end 145 of the mandrel within the bore 147 of the tailstock spindle 153, acts as an aspirator, (cf. Ganot's Physics, Atkinson, 16th edition, 1903, section 208), producing a subatmospheric pressure on the already heated end of the tube. The low pressure on the formed side of the tube acts to maintain close engagement of the glass with the mandrel on its "forwardmost" stroke, after the flame has passed, without sticking, so that the bore of the finished pipette is extremely accurate. It may be of some significance, although the theory forms no part of the invention, that the temperature of the mandrel at the immediate area of heating by the flame is probably lower than the temperature of the mandrel in the area between the point at which the glass is heated directly and the tailstock, because the cooling fluid in the mandrel is heated as it moves from the point at which the glass is being heated directly, toward the tailstock. In any event, however, the mandrel is heated only about half as hot as an uncooled mandrel would be, while at the same time the glass is several hundred degrees hotter than blanks formed on solid mandrels can successfully be heated. The effect of the rapid flow of cooling fluid is to maintain a substantially uniform temperature in the mandrel at the point at which the glass is hardening.

The bulb and aspirator sections are formed as in the embodiment of FIGURES 1–6.

In making diverse tubular units, in which the bore is of substantially larger size than the capillary bore of blood dilution pipettes, and where the wall thickness of the tube is greater, a higher rate of vibration of the mandrel is preferable. This is because a larger energy input is desirable, and a greater amplitude is not as practical as a higher frequency. Also, in forming a unit flow meter tube with a larger inside diameter, the mandrel can have a larger inside diameter and the cooling fluid need be under less pressure to force an equal volume of fluid through the mandrel. Further, in making such large-bore tubes, a relatively high vacuum can be applied between the heated glass and the end of the mandrel from which the heating proceeds, as by the pump 62 of the embodiment shown in FIGURES 1–6. No vacuum need be applied from the cool (last-heated) end; therefore there is no danger of sucking softened glass back under an unsoftened section, which is one of the serious difficulties of methods known heretofore.

The rate of vibration of the mandrel, and the rate of rotation of the glass with respect to the mandrel may be varied over wide ranges.

The minimum rate of vibration is that at which the relative movement of the mandrel with respect to the glass is just sufficient to maintain free motion of the mandrel with respect to the glass. The upper limit of vibration is the point just below that at which cavitation or other objectionable reaction of the glass occurs. The lower limit of the rate of rotation of the glass with respect to the mandrel is just above that at which the glass sags. The upper limit of the rate of rotation is just below the rate at which the softened glass is displaced outwardly by centrifugal force.

It has been found that in using a very thin mandrel which has a tendency to sag or "corkscrew," the glass, rotating around the mandrel has a strong tendency, as it hardens, to hold the mandrel straight so that the bore produced is not only accurately dimensioned but straight.

There seems also to be no critical taper angle for the mandrel. Both untapered mandrels and steeply tapered mandrels have been found to be operative.

For nonsymmetrical cavities or cavities which are not circular in cross section, the relative rotation of the mandrel and article may be dispensed with and reliance may be had solely on the vibration and cooling. In such an arrangement the mandrel and article may be rotated together to prevent sagging of the glass under the high heat permitted by the cooled and vibrating mandrel. For circular cavities, the mandrel may be rotated in a different direction or at a different speed from the blank or may be given an oscillating rotary motion, without being vibrated, but this has been found to be substantially less effective than vibration alone. Combinations of rotary movement and longitudinal vibration of the mandrel may also be used, but the simple process described is preferred.

While the relative motion of the mandrel and article to be formed is of great importance, in order to attain optimum results with the method of this invention it is necessary to cool the mandrel, because of the high temperatures employed to obtain rapid forming speeds.

In the method of this invention, when provision is made for preventing sagging of the glass of the blank from which the article is to be made, as, for example, by rotating the blank, the blank can be heated until the glass becomes almost as liquid as water. Thus, in the illustrative embodiment described, a blank of soft glass is heated to a temperature of 1500–1700° F., and "Pyrex" glass may be heated even higher. This is in marked contrast to methods known heretofore of forming tubes on solid mandrels without relative movement of the mandrels and blanks, where the temperature of the glass has been held to around 1150° F. At this relatively low temperature the glass is stiffly plastic and requires a high vacuum from the unheated end of the blank to cause confirmation of the glass. The use of such low temperature makes the prior art process slow and difficult. The method of this invention is thus not only several times faster than methods known heretofore, but permits the forming of articles at the higher speeds to tolerances equal to or better than those attained heretofore. In fact, a result of the use of the method of this invention is a striking uniformity in appearance and quality of the formed articles. This results in a much more economical production than has been possible heretofore.

The arrangement of double, hollow shells to serve as the destructible form within the blank can be utilized to produce a pronounced internal annular ridge, which is useful in facilitating mixing a solution within the enlarged chamber. It is to be observed, however, that the exterior of the article is smooth and seamless, the integrity of the formed part of the blank remaining undisturbed. This distinguishes from many of such articles known heretofore, in which various parts of the articles were separately made and then joined, or opened to permit insertion of mixing beads and the like and then resealed. The method and apparatus of this invention thus produces articles of a strength and uniformity of wall thickness superior to many of those used heretofore and, at a speed greater than has been possible heretofore. Simply by way of example, the blood dilution pipettes produced by this method and apparatus have a wall thickness in the bulb or mixing chamber approximately four times as great as that of hand blown pipettes. In the latter, the bulb has been a point of weakness.

It is of interest to note that the colloidal carbon which is put on the mandrel does not appear in the glass, nor does it accumulate on the mandrel. While the reason for this is unknown, it appears that the material may be oxidized to form carbon dioxide.

As has been brought out, while the present teachings are of great value when used in connection with the formation of articles such as pipettes, they may be advantageously employed in the formation of other articles; for example, glass syringe barrels.

Thus, among others, the several objects of the invention as specifically aforenoted are achieved. Obviously, the structure of the tubular unit and especially the pipette may be varied, the machine may be redesigned in various aspects, and the steps of the method may be altered without departing from the spirit of the invention as defined by the claims.

Having thus described the invention, what is claimed and desired to be secured by Letters Patent is:

1. The process of producing a blood dilution pipette from a blank of glass tubing, comprising inserting a mixing bead within a hollow shell, mounting said shell on a mandrel, inserting said mandrel and shell in said blank, applying softening heat to said blank while subjecting its bore to vacuum to collapse said blank on said mandrel and shell, withdrawing said mandrel, introducing into the passage produced by the withdrawal of said mandrel an agent which will dissolve said shell but not said blank nor said mixing bead, and dissolving said shell.

2. The process of producing a glass blood dilution pipette from a blank of glass tubing, comprising inserting within said tubing a hollow, open-ended, tapered mandrel having removably mounted upon it a hollow shell containing a mixing bead; forcing a stream of cooling fluid through said hollow mandrel; softening by heat the glass blank along the said mandrel to a point adjacent said shell while subjecting its interior to the action of vacuum, thereby to collapse said blank around said mandrel; then heating the blank along the zone of the shell to the softening temperature of the glass; discontinuing the heating of said blank; applying a vacuum to the interior of said blank, sucking the softened glass down onto said shell and said mandrel; cooling said blank below the softening temperature of the glass; withdrawing said mandrel from said blank while retaining the shell within the latter; introducing a shell-dissolving agent into the interior of said blank through the passage produced by the withdrawal of said mandrel, and dissolving said shell.

3. A method of producing a pipette the major length of which embraces aspirating and capillary tubes of different bore diameters separated by an intermediate chamber of larger diameter than such bores, such method including ensleeving a tube of glass over a mandrel having two cylindrical sections of different diameters defined by a zone of juncture, disposing a shell of destructible material on said mandrel adjacent such juncture of the mandrel sections with a portion of the shell body contacting the surface defining the juncture thereof to thereby retain the shell against movement longitudinally of said mandrel in one direction and with its outer surface spaced from the mandrel to define a space corresponding to the larger chamber diameter, said shell having included therein a mixing bead made of a material substantially unaffected by the action of acid and being of a diameter larger than the aspirating and capillary tubes of the pipette, applying heat to said tube to render it plastic, subjecting the interior of the tube to vacuum to constrict said tube to conform to the diameters of said mandrel and shell and only then moving the tube and mandrel axially of each other for a distance such that the mandrel is withdrawn from the tube bore in the direction of the larger cylindrical section and with said shell retained within the tube chamber and dissolving said destructible shell in acid.

4. The method of claim 3 wherein the glass tube is caused to conform to the shell disposed therein after the capillary and aspirating tubes have been formed.

5. A method of producing a pipette having a central chamber with aspirating and capillary tubes of smaller bores than said chamber extending from its opposite faces, said method involving the use of a mandrel having end zones presenting surfaces corresponding to the diameters of said tube bores, disposing upon said mandrel a shell having a diameter corresponding to that of the central chamber, employing a thermoplastic tube of a length substantially equal to that of the pipette, ensleeving such tube over the mandrel and shell, subjecting the bore of said tube to the action of vacuum while simultaneously exposing an end zone of the tube exterior to heat such that it is rendered plastic and collapses into conforming contact with the surface of said mandrel, progressively heating other tube zones in the direction of the shell to similarly collapse them to thereby furnish one pipette tube at a point short of said shell, controlling the heat, its progress over the tube and the vacuum to enclose the shell within tube material to thereby provide the pipette chamber, continuing such progress and control to collapse a final tube portion beyond said shell into contact with said mandrel and thereby provide the second pipette tube and withdrawing said mandrel from said tube and shell with the latter remaining within said tube.

6. The method of making a tubular glass article having a relatively smaller bore from a tubular glass blank having a relatively larger bore by shrinking the glass blank around a tubular mandrel which consists of: first ensleeving the tubular glass blank over the tubular mandrel; sucking air from a first end only of said tubular glass blank without sucking air outwardly from the other end; applying a heat source to the tubular glass blank to soften the glass at a point adjacent the first end of the blank and progressively shifting the heat source in a direction towards the second end of the blank to progressively soften the glass while continuing to suck air from the said first end only of the tubular glass blank to reduce the pressure in said blank to cause it to shrink around said mandrel; simultaneously flowing cooling fluid through the tubular mandrel throughout the heating operation to maintain the mandrel at a temperature lower than the temperature of the corresponding portions of the glass blank; and finally after relative cooling of the parts shifting the shrunken tubular glass article and mandrel relative to each other longitudinally to separate the article from the mandrel.

7. The method of making a tubular glass article having a relatively smaller bore from a tubular glass blank having a relatively larger bore by shrinking the glass blank around a tubular mandrel as set forth in claim 6 in which the cooling fluid which is flowed through the mandrel is discharged in a confined space leading from and communicating with the first end of the tubular glass blank so as to cause an aspirating action to suck air from the first end of the tubular glass blank.

8. The method of making a tubular glass article having a relatively smaller bore from a tubular glass blank having a relatively larger bore by shrinking the glass blank around a tubular mandrel as set forth in claim 6 in which the tubular glass blank and mandrel are moved continuously relative to each other throughout the heating and shrinking operation.

References Cited in the file of this patent

UNITED STATES PATENTS

| | | |
|---|---|---|
| 1,583,464 | Housekeeper | May 4, 1926 |
| 1,762,807 | Arnold | June 10, 1930 |
| 2,084,811 | Keen | June 22, 1937 |
| 2,106,193 | Sloan | Jan. 25, 1938 |
| 2,209,739 | Meyer | July 30, 1940 |
| 2,392,104 | Smith | Jan. 1, 1946 |
| 2,458,934 | Everett | Jan. 11, 1949 |
| 2,490,252 | Brewer | Dec. 6, 1949 |
| 2,532,091 | Everett | Nov. 28, 1950 |
| 2,582,818 | Coby | Jan. 15, 1952 |
| 2,711,055 | Majkrzak et al. | June 21, 1955 |
| 2,726,549 | Geffen | Dec. 13, 1955 |
| 2,754,626 | Porter | July 17, 1956 |
| 2,771,710 | Molinari et al. | Nov. 27, 1956 |
| 2,835,079 | Camarata et al. | May 20, 1958 |